United States Patent
Derrien et al.

(10) Patent No.: US 8,297,966 B2
(45) Date of Patent: Oct. 30, 2012

(54) NOZZLE FOR A CONTAINER MANUFACTURING MACHINE

(75) Inventors: Mikaël Derrien, Octeville sur Mer (FR); Xavier Le Dieu, Octeville sur Mer (FR); Franck Lacaille, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 87 days.

(21) Appl. No.: 12/526,694

(22) PCT Filed: Feb. 7, 2008

(86) PCT No.: PCT/FR2008/000144
§ 371 (c)(1),
(2), (4) Date: Jan. 22, 2010

(87) PCT Pub. No.: WO2008/113907
PCT Pub. Date: Sep. 25, 2008

(65) Prior Publication Data
US 2010/0143531 A1 Jun. 10, 2010

(30) Foreign Application Priority Data
Feb. 16, 2007 (FR) ...................................... 07 01130

(51) Int. Cl.
*B29C 49/12* (2006.01)
*B29C 49/58* (2006.01)

(52) U.S. Cl. ........................................ 425/529; 425/535

(58) Field of Classification Search ................... 425/529, 425/535
See application file for complete search history.

(56) References Cited

U.S. PATENT DOCUMENTS

| | | | | | |
|---|---|---|---|---|---|
| 3,993,427 | A | * | 11/1976 | Kauffman et al. | ............ 425/529 |
| 4,284,397 | A | * | 8/1981 | Michel | ............ 425/529 |
| 4,403,940 | A | * | 9/1983 | Krishnamumar et al. | ..... 425/529 |
| 4,552,527 | A | * | 11/1985 | Hunter | ............ 425/535 |
| 7,563,092 | B2 | * | 7/2009 | Mie | ............ 425/535 |
| 7,824,166 | B2 | * | 11/2010 | Mie et al. | ....... 425/182 |
| 2003/0077349 | A1 | | 4/2003 | Derouault et al. | |
| 2006/0115546 | A1 | | 6/2006 | Santais et al. | |
| 2008/0124424 | A1 | * | 5/2008 | Mie et al. | ....... 425/535 |

FOREIGN PATENT DOCUMENTS

| | | |
|---|---|---|
| DE | 100 63 553 A1 | 7/2002 |
| FR | 2 848 905 A1 | 6/2004 |
| WO | 01/53063 A1 | 7/2001 |

* cited by examiner

*Primary Examiner* — Robert B Davis
(74) *Attorney, Agent, or Firm* — Sughrue Mion, PLLC (57) ABSTRACT

Nozzle for a blowing or stretch-blow molding of containers starting from parisons made of plastics, said nozzle having a nozzle body capable of coming in contact with an upper face of a mold designed for receiving a parison, said nozzle being characterized in that it comprises:
   An insert provided with a frusto-conical contact face capable of contacting a mouth of the parison, wherein said insert is displaceable with respect of the nozzle body between an upper position and a lower position, and
   A return spring which biases the insert towards its lower position.

13 Claims, 9 Drawing Sheets

NOZZLE FOR A CONTAINER MANUFACTURING MACHINE

CROSS REFERENCE TO RELATED APPLICATIONS

This application is a National Stage of International Application No. PCT/FR2008/000144 filed Feb. 7, 2008, claiming priority based on French Patent Application No. 0701130, filed Feb. 16, 2007, the contents of all of which are incorporated herein by reference in their entirety.

The invention relates to the field of container manufacture, through blowing or stretch-blow molding.

The blowing of containers is achieved in a mold defining a cavity in which is introduced a parison made of plastics, previously heated in order to soften the material (the term "parison" not only refers to a preform, but also to an intermediate container which has undergone one or more preliminary blowing steps). The parison is thereafter pressurized in order to give it a predetermined shape corresponding to the shape of the cavity.

Introducing a gas within the parison is achieved via a nozzle which, after the parison is received inside the cavity through an opening in the mold, is put in sealing contact with an upper face thereof. Considering its shape, the nozzle, which covers the parison neck protruding from the mold, is generally called "bell nozzle".

This technique is disclosed in French patent application No. FR 2 848 905 or to US equivalent patent application No. US 2006/0115546, both assigned to Sidel.

This technique is satisfactory, but may be enhanced. Indeed, the containers are frequently misshaped, e.g. having a neck inclined with respect of the body. Experiments conducted by the inventors have proven that such a misshape is due to a bad positioning of the parison in the mold resulting from a bounce phenomenon: the parison, positioned above the opening and dropped in the mold from a certain height (greater than the length of the body), tends to bounce via its collar against the upper face of the mold. The bouncing may be of several centimeters and in some cases the parison has no time for re-centering while falling in the mold opening, before the nozzle covers it up. In such circumstances the nozzle blocks the parison in its misaligned position. The blowing, which is conducted despite the misalignment, leads to a bad shaped container which, in addition of being unaesthetic, is mostly unusable for filling and capping.

Visual control and ejection of badly shaped containers help preventing such containers from being filled and capped. However, those solutions are complicated and expensive, and they do not lower the waste rate.

The invention aims at resolving the above mentioned drawbacks of the known techniques and at proposing a solution permitting to enhance the average quality of containers.

To this end, the invention provides, according to a first aspect, a nozzle for a container blowing or stretch-blow molding machine starting from parisons made of plastics, said nozzle comprising:
- a nozzle body capable of coming in contact with an upper face of a mold designed for receiving a parison:
- An insert provided with a contact face capable of contacting a mouth of the parison, wherein said insert is displaceable with respect of the nozzle body between an upper position and a lower position, and
- A return member (e.g. a return spring) which biases the insert towards its lower position.

The contact face may be planar and perpendicular to an axis of displacement of the insert. In another embodiment, the contact face is frusto-conical; it may have an aperture angle comprised between 10° and 60°, with respect of a plane perpendicular to an axis of displacement of the insert.

In yet another embodiment, the contact face of the insert has a planar central portion (having an outer diameter preferably greater than or equal to the diameter of the mouth of the parison), which extends through a frusto-conical peripheral portion.

In a preferred embodiment, the nozzle body comprises a shoulder which defines an overtravel limit stop for the insert in the lower position.

According to a second aspect, there is provided a machine for the blowing or stretch blow molding of containers starting from parisons made of plastics, comprising:
- At least one molding unit comprising a mold designed for receiving a parison, and
- A nozzle as depicted hereabove, movably mounted between an upper position in which the nozzle is spaced apart from an upper face of the mold in order to allow for parison introduction, and a lower position in which the nozzle is in contact with the upper face of the mold.

The above and other objects and advantages of the invention will become apparent from the detailed description of preferred embodiments, considered in conjunction with the accompanying drawings.

On FIG. 1-8 is partly shown a machine 1 for the blowing or stretch blow molding of containers starting from parisons 2 made of a plastic material such as PET. Although the parison 2 may be an intermediate container which may have undergone at least one preliminary blowing, it is assumed in the following that the parison 2 is a preform which has undergone a heating at a temperature higher than the glass transition temperature.

The preform 2 comprises a neck 3, which remains unchanged during the blowing and has at an upper end a mouth 4 of circular shape. The container has a collar 5 permitting suspension of the preform during the manufacturing steps (heating, blowing) of the container, and, extending under the collar 5, a body of substantially cylindrical shape, closed at a lower end by a spherical bottom 7.

In practice, the machine 1 includes a plurality of molding units 8 only one of which is illustrated on the drawings. The molding unit 8 comprises a mold 9 including a cavity 10 defining the final shape of the container. At an upper end, the mold 9 has an upper face 11 on which the cavity opens via a circular opening through which the preform 2 is introduced in the mold 9. As depicted on FIG. 1, the opening 12 is provided with a counterbore 13 in which the collar 5 locks when the preform 2 is normally inserted within the mold 9 (see FIG. 4).

The molding unit 8 further comprises a bell nozzle 14 which is mounted in a displaceable manner, along the mold axis, between an upper position wherein the nozzle 14 is spaced apart from the upper face 11 of the mold 9 in order to allow for preform introduction, and a lower position in which the nozzle 14 is in contact against the upper face 11.

Figure 1:
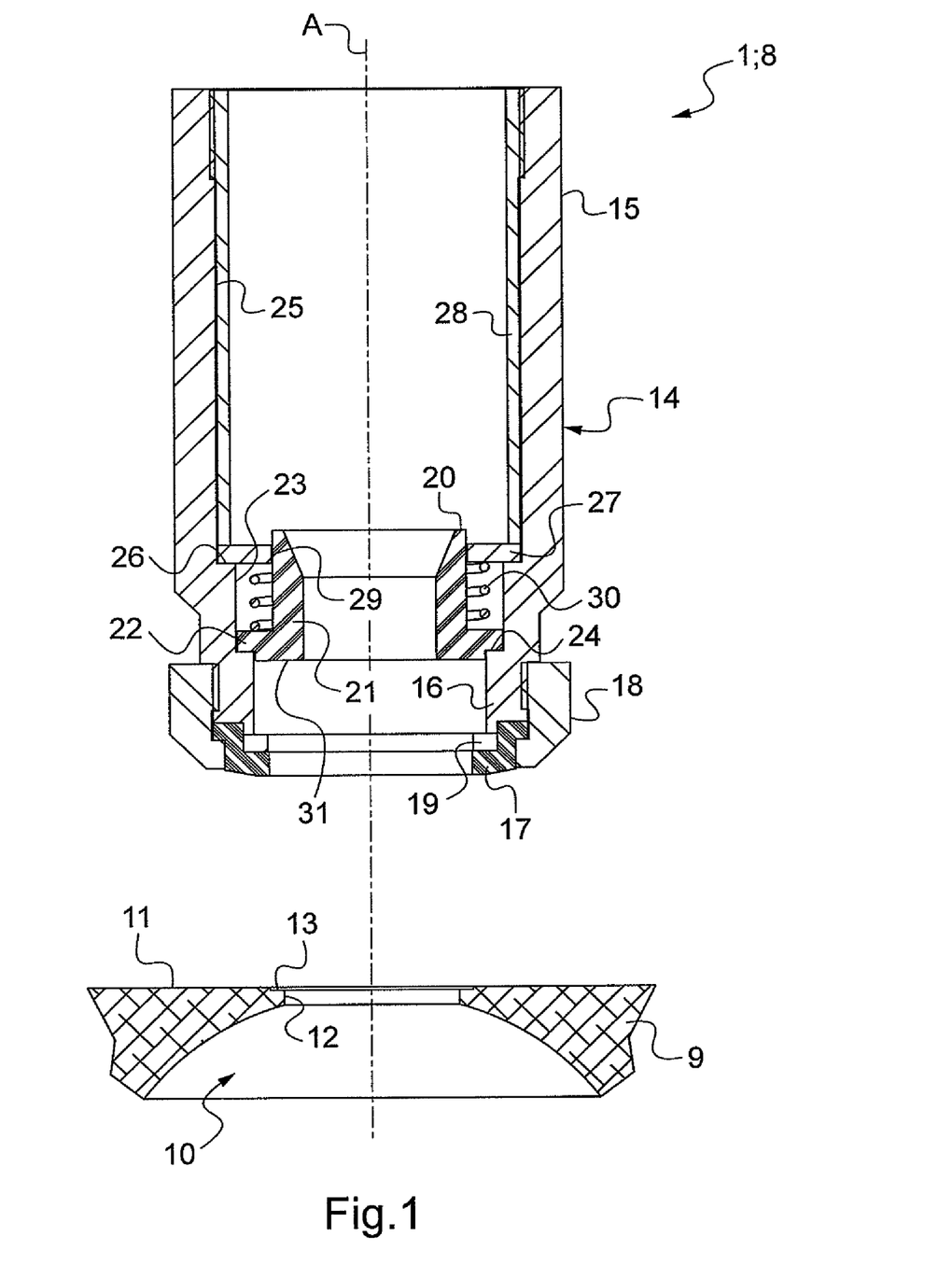
FIG. 1 is an elevation sectional view showing a nozzle located above a mold designed for receiving a parison for the manufacture of a container.
Figure 2:
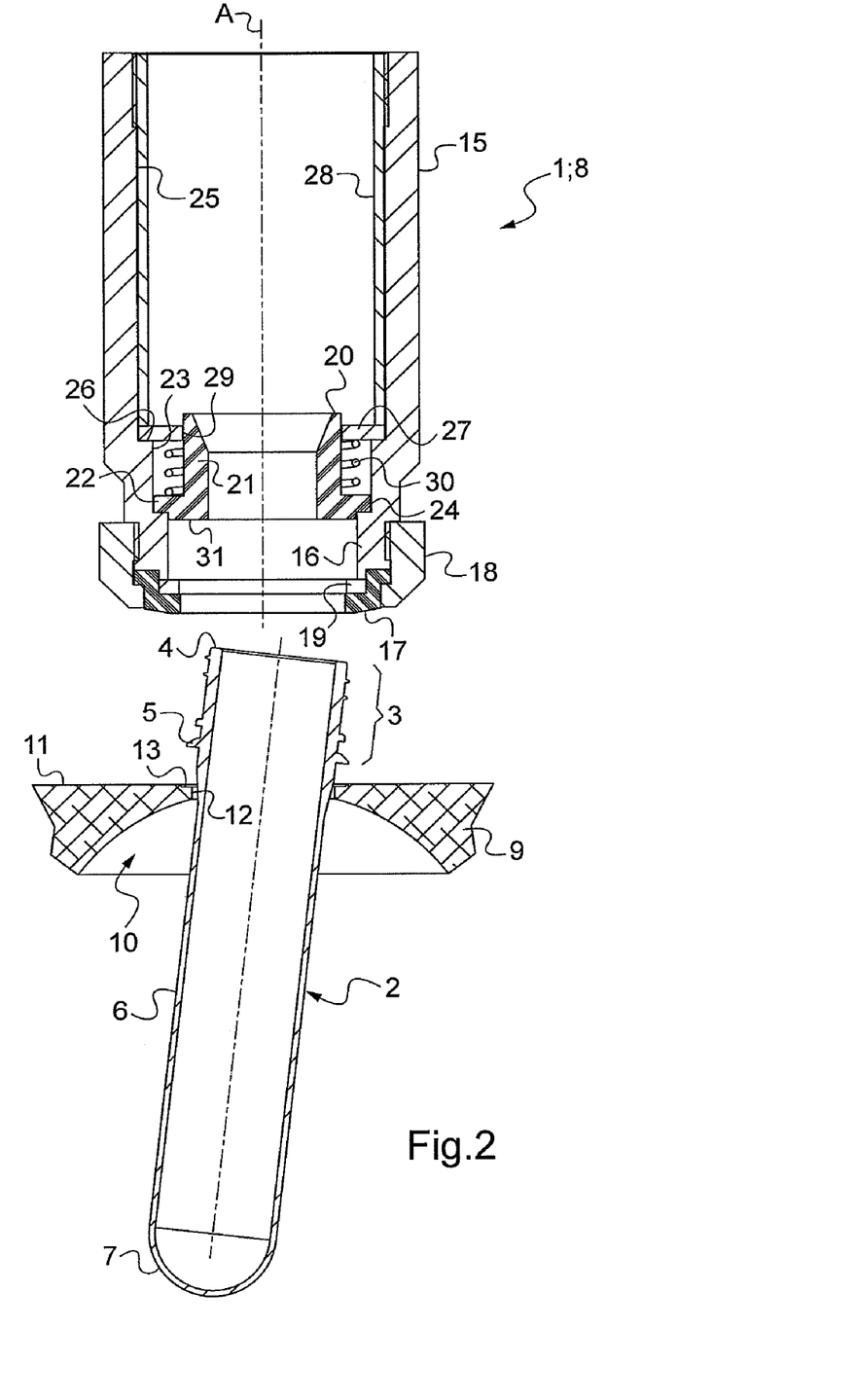
FIG. 2 is a view similar to FIG. 1, at the time when a preform has just been introduced within the mold.

The nozzle 14 comprises a tubular nozzle body 15 which, in the stretch-blow molding configuration, receives a movable stretch rod.

At a lower end, the nozzle body 15 is conformed as a threaded rod end 16 on which is mounted an annular sealing joint 17 (made of a resilient material such as natural or synthetic rubber, or even silicone), fixed through a ring 18 screwed onto the rod end 16 with a washer 19 interposed therebetween.

The nozzle 14 is further provided with an insert 20 coaxially mounted in the nozzle body 15, in the vicinity of the lower end thereof. The insert 20 has a substantially tubular upper part 21 and an annular lower part 22 radially protruding from the upper part 21.

The insert 20 is mounted in a bore 23 formed in the nozzle body 15. The bore 23 has an inner diameter slightly greater than the overall diameter of the insert 20 (corresponding to the outer diameter of the annular lower part 22), in order to allow for axial displacement of the insert 20 within the bore 23.

The bore 23 is limited, on the lower side, by a shoulder 24. On the opposite side, the bore 23 extends through a hole 25, with a counterbore 26 therebetween. A washer 27 is mounted in the hole 25 and is in tight contact with the counterbore 26 by means of a tubular jacket 28 received in the hole 25 and fixed thereto by means of screws or any equivalent.

The washer 27 comprises a central hole 29 through which the tubular upper portion 21 of the insert 20 extends with a clearance. A return compression spring 30 is mounted around the upper part 21 between the washer 27 and the annular part 22 of the insert 20.

Therefore, the insert 20 is axially movable in the nozzle body 15 between:
  A lower position, in which the insert 20 is in contact, through its annular part 22, with the shoulder 24 which forms an overtravel limit stop for the insert 20, and
  An upper position in which the insert 20 is spaced from the shoulder 24, against the return spring 30.

The return spring 30 constantly biases the insert 20 towards its lower position. When completely compressed, the spring 30 forms an overtravel limit stop for the insert 20 in the upper position.

The insert 20 comprises, at a lower end, a contact face 31 capable of coming and contacting the mouth 4 of the preform 2, whereby, through the return force exerted by the spring 30, the preform 2 is forced into contact with the upper 11 face of the mold 9. Accordingly, the risks of preform misalignment during the blowing are minimized.

When exiting the oven, the preform 2 is driven to a position above the opening 12 and dropped in the mold 9. FIG. 2-6 show a situation which occurs frequently: the preform 2 bounces against the upper face 11 of the mold 9, against the opening 12 and/or the counterbore 13, and tends to misalign. As at the same time the nozzle 14 is driven down to come in abutment against the mold 9 in preparation for blowing, the moving nozzle 14 may block the preform 2 in a misaligned position, wherein the collar 5 overlaps the counterbore 13.

Figure 3:
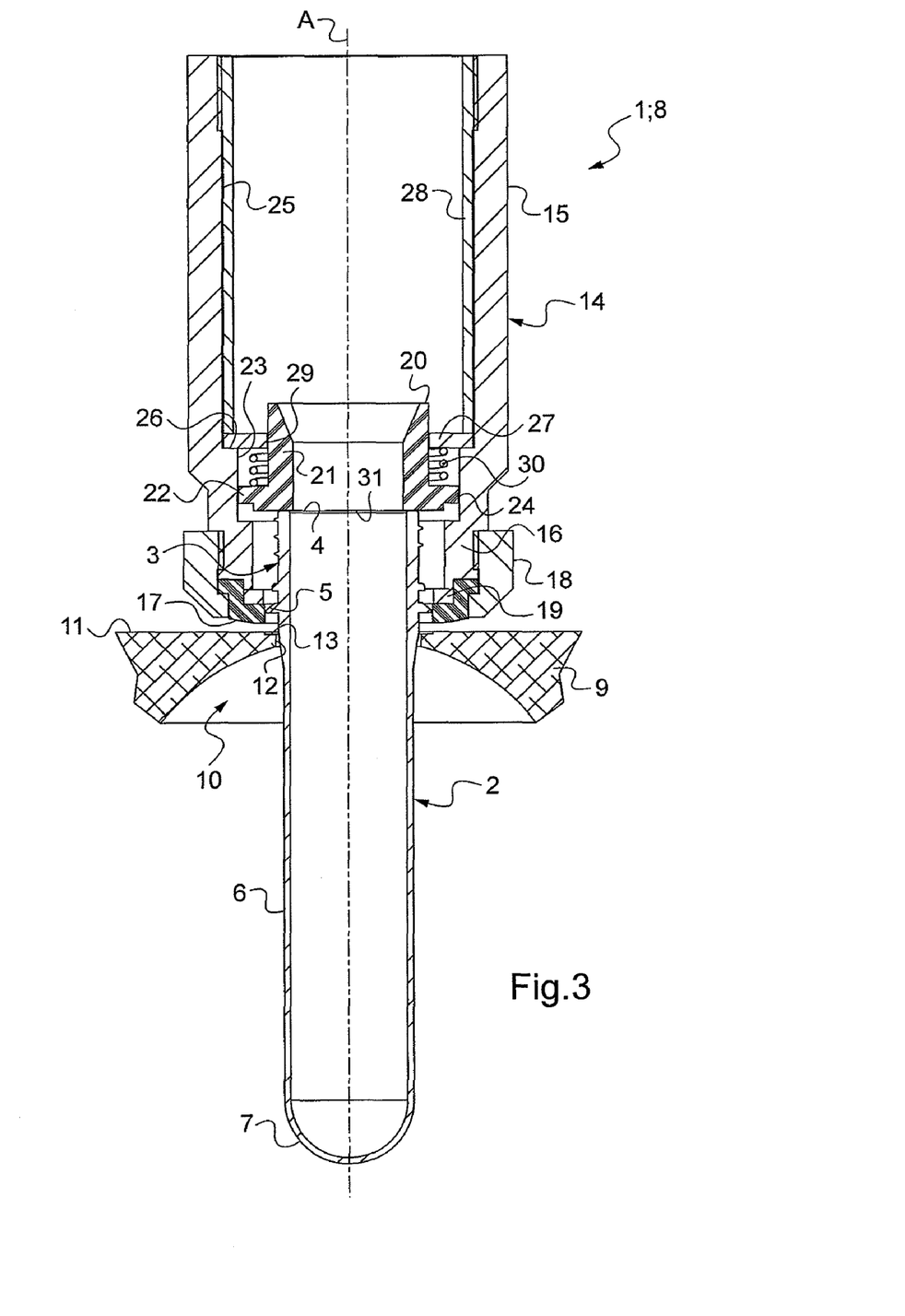
FIG. 3 is view similar to FIG. 2, wherein the nozzle is being driven down onto the mold.
Figure 4:
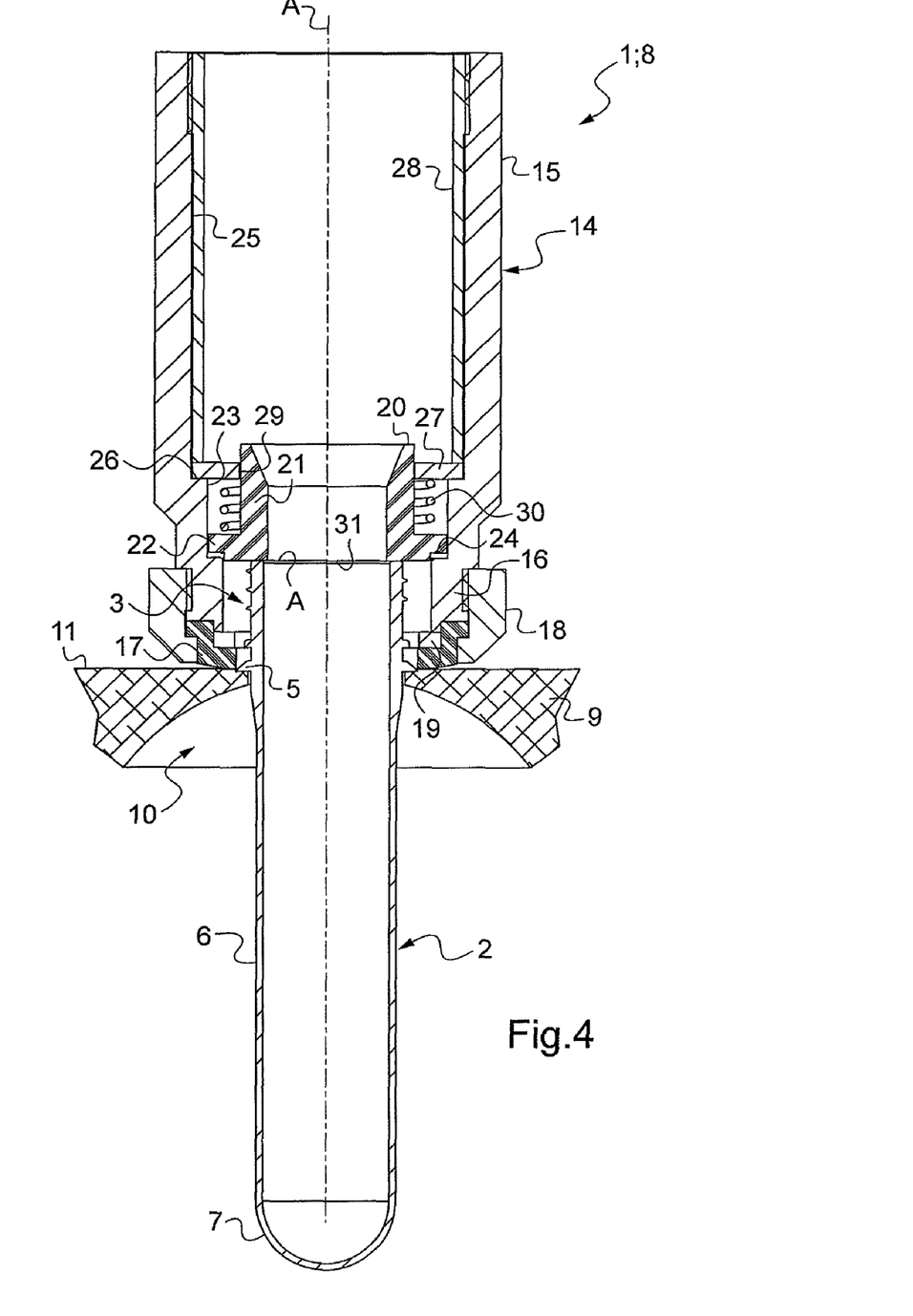
FIG. 4 is a view similar to FIG. 3, showing the nozzle in contact with the mold.
Figure 5:
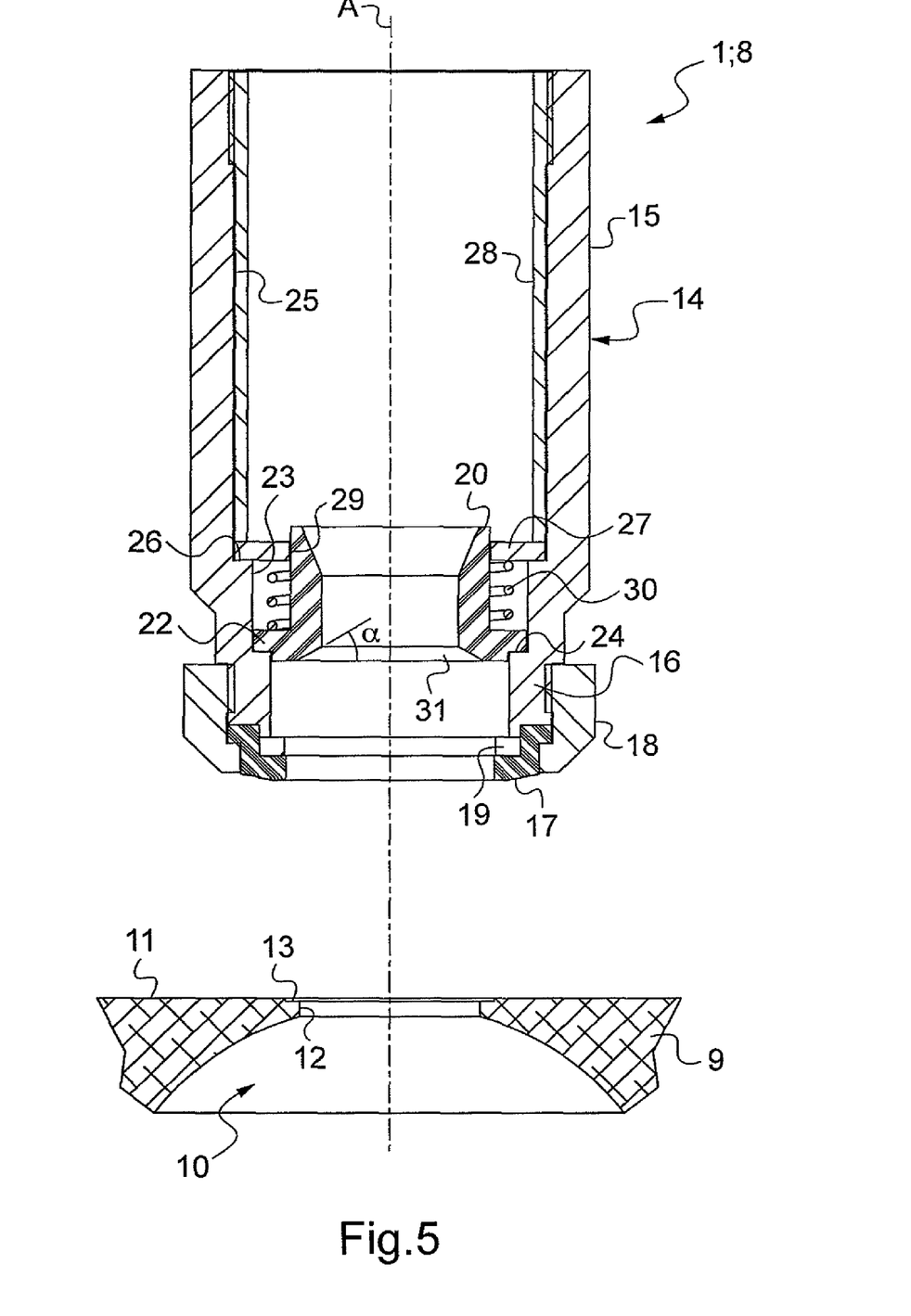
FIG. 5-8 are views similar to FIG. 1-4, respectively, showing the nozzle in another embodiment.
Figure 6:
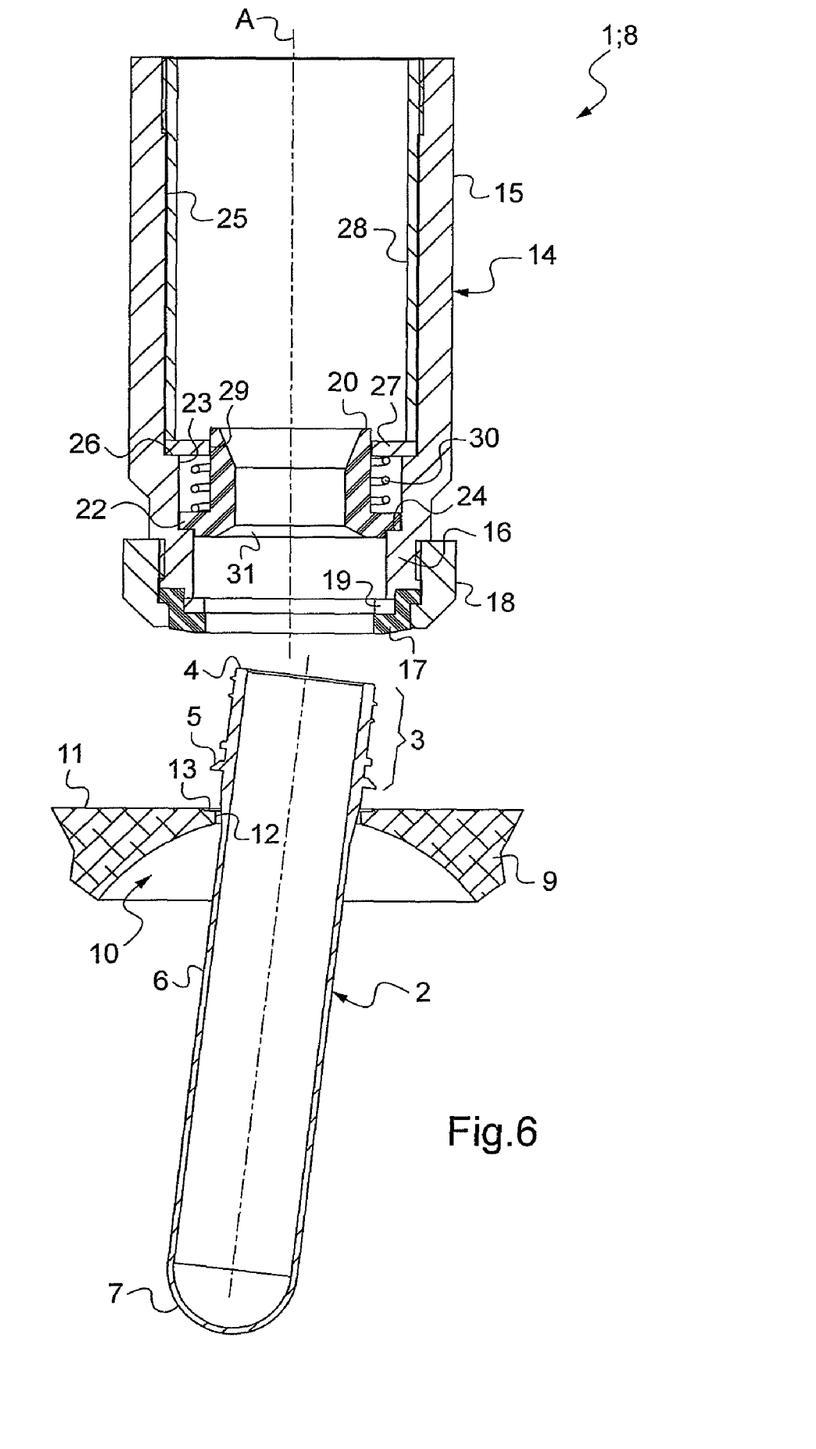
Figure 7:
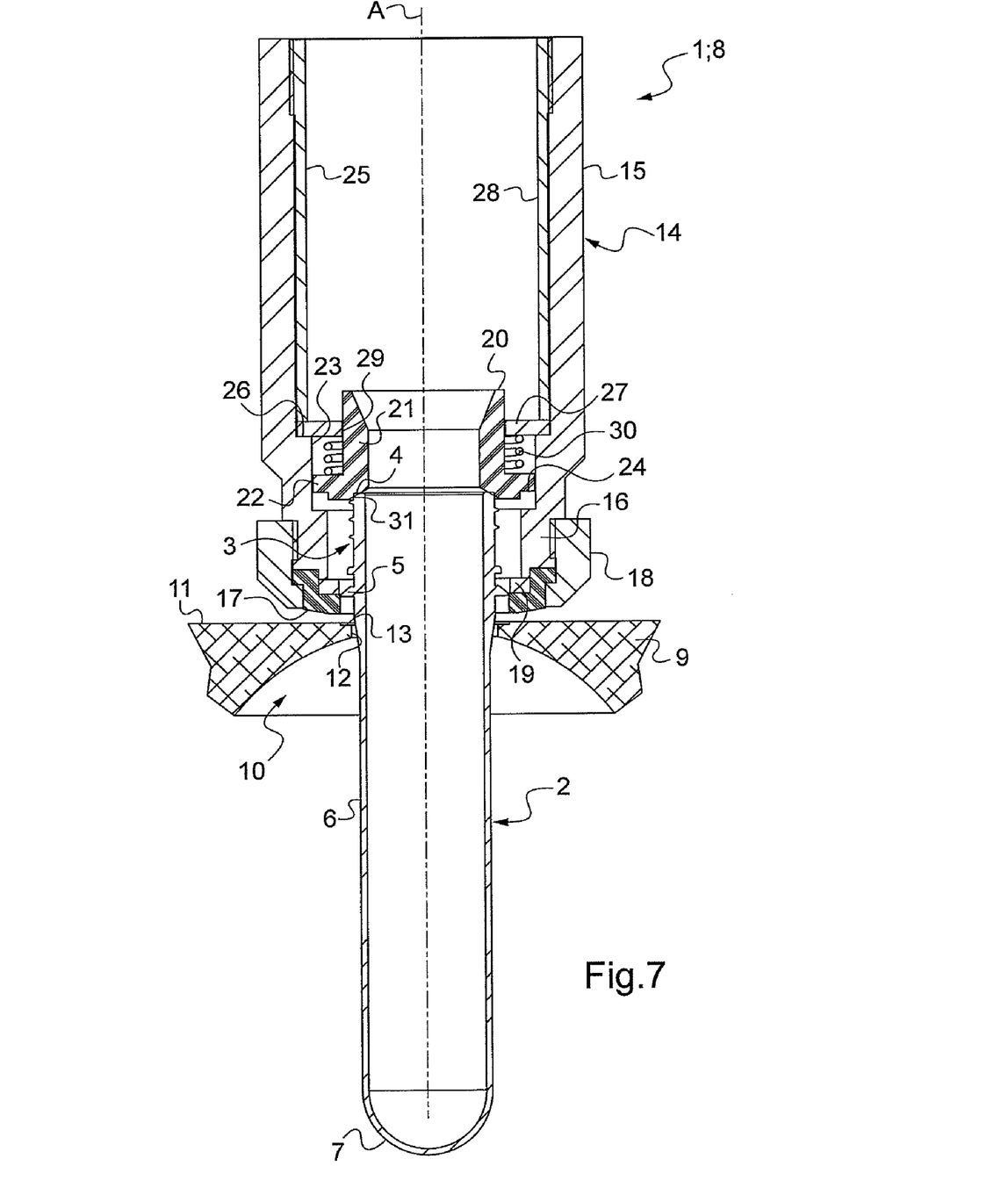
Figure 8:
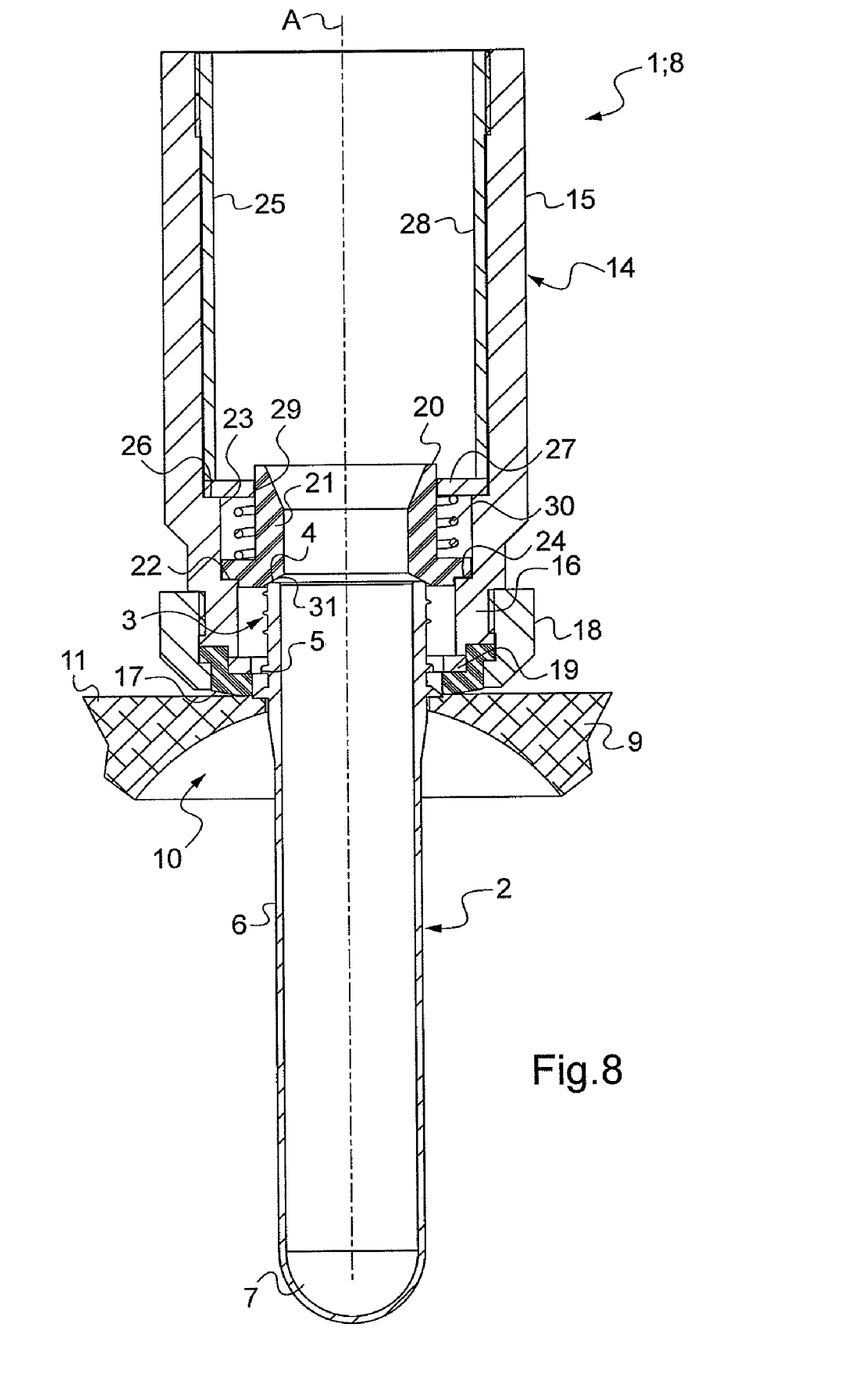

In case the preform 2 bounces against the mold 9, the preform 2 collides, through its mouth 4, with the contact face 31 of the insert 20 (see FIG. 3 and FIG. 7). Part of the collision energy is absorbed by the return spring 30 and the simultaneous backward movement of the insert 20, which thus acts as a shock absorber for the preform 2. The expansion of the spring 30, which occurs within a fraction of a second after the shock, pushes the preform 2 against the upper face 11 of the mold 9 with the collar 5 properly locked within the counterbore 13, whereas the nozzle 14 continues to descend until it has reached its lower position (FIGS. 4 and 8). The number of bounces of the preform 2 is therefore limited (trials have shown that the preform 2 merely undergoes one bounce), thereby limiting the risk of preform misalignment with respect of the mold 9.

As depicted on FIG. 4 and FIG. 8, in the lower position of the nozzle 14, the insert 20, which is in contact with the mouth 4 of the preform 2, is slightly spaced apart from the shoulder 24, whereby the preform 2 is permanently in contact with the mold 9, which is made possible by the dimensions of the nozzle 14. More precisely, the distance between the contact face 31 and the lower face of the joint 16 (through which the joint 16 is in contact with the upper face 11 of the mold 9) is lower than the height of the neck 3.

In an embodiment illustrated on FIG. 1-4, the contact face 31 is planar and perpendicular to the axis A of revolution of the insert 20 (which axis A is identical to the axis of displacement of the insert 20, in turn identical to the axis of the nozzle 14).

In a preferred embodiment depicted on FIG. 5-8, the contact face 31 is frusto-conical with revolution symmetry around axis A.

Accordingly, at the first bounce the preform 2 colliding with the insert 20 is re-centered and stabilized with respect of the mold axis by the frusto-conical contact face 31. The alignment is maintained by the constant contact of the insert 20 with the preform 2 in the lower position of the nozzle 14 (see FIG. 8). As depicted on FIG. 8, the frusto-conical contact face 31 is in contact with an outer edge of the mouth 4, thereby limiting the contact between the mouth 4 and insert 20 and preserving the hygiene of the system.

The skilled person is free to choose the aperture angle α of the contact face 31, with respect of a plan perpendicular to the axis A of the insert 20. The skilled person shall try to find a good compromise between the contact force of the preform 2 against the mold 9 (obtained through an open angle α, which maximizes the axial component of the force exerted by the insert 20 on the preform 2), and the preform alignment (obtained through a closed angle α, maximizing the radial component of the force exerted by the insert 20 on the preform 2). To this end, the angle α is preferably comprised between about 10° (corresponding to the first case) and 60° (corresponding to the second case). In the embodiment depicted on FIG. 5-8, the aperture angle α of the contact face 31 is of about 20°.

Figure 9:
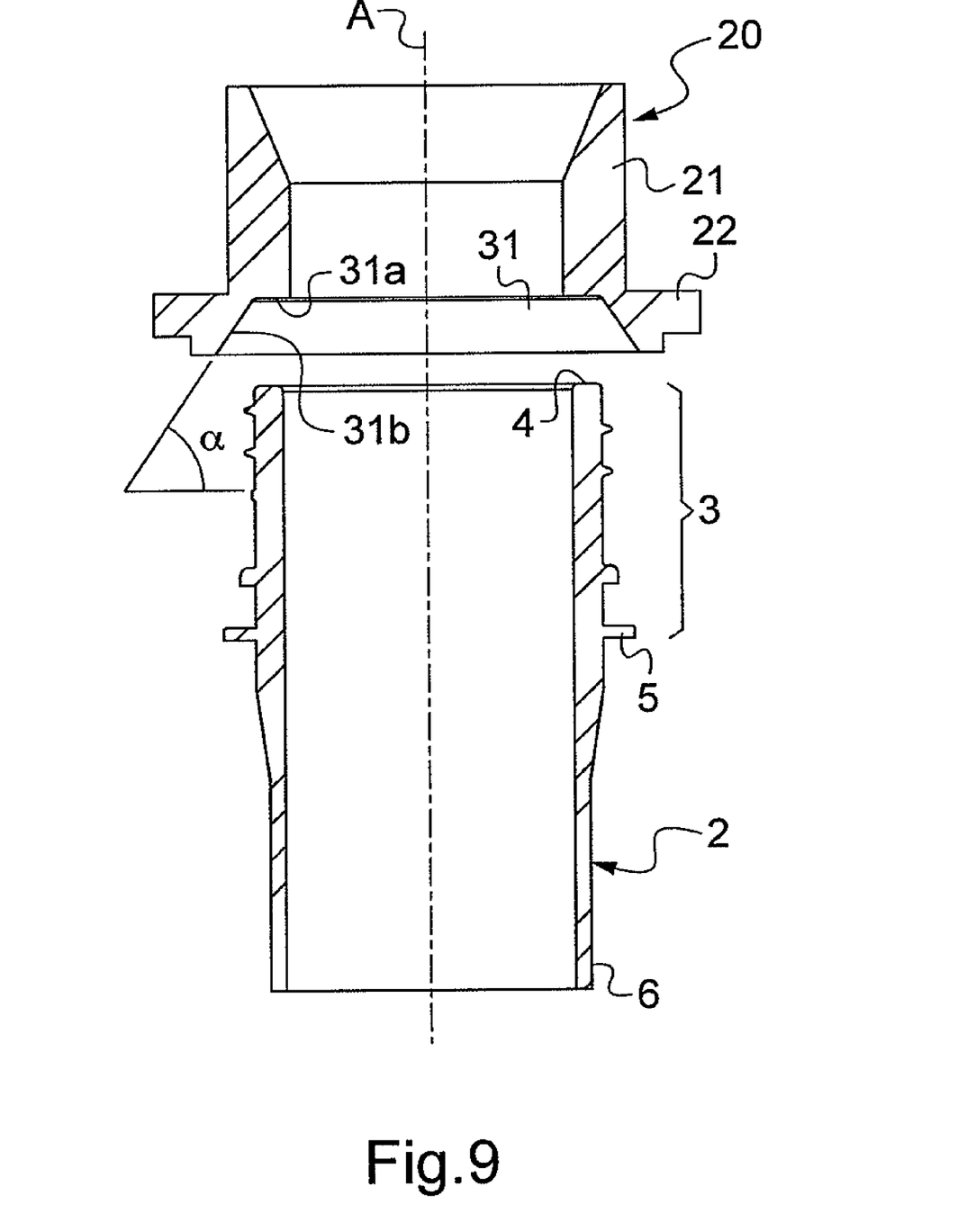
FIG. 9 is a partial view showing another embodiment of the nozzle, located above a preform.

In another embodiment, depicted on FIG. 9, the contact face 31 includes both a planar portion and a frusto-conical portion. More precisely, the contact face 31 has a planar central portion 31a, the outer diameter of which is greater than or equal to the diameter of the mouth 4, and which extends through a frusto-conical peripheral portion 31b the aperture angle of which shall be chosen in the manner disclosed hereinbefore. In the embodiment depicted on FIG. 9, the aperture angle α of the frusto-conical peripheral portion 31b is of about 60°.

Therefore, the insert 20 acts onto the preform in two strokes. In a first stroke, as the nozzle 14 is driven down, the preform 2 is centered after having bounced against the mold, when the mouth 4 of the misaligned preform 2 collides against the frusto-conical peripheral portion 31b; in a second stroke, after the preform 2 is stabilized and aligned in the mold axis, the insert 20 maintains the preform 2 in close contact with the upper fare 11 of the mold A through the planar central portion 31a.

The inventors have remarked that the insert 20 allows for a drastic reduction of the rate of misaligned preforms during the blowing process. In consequence, the waste rate is lowered and the average quality of the blown containers is increased.

The invention claimed is:

1. Nozzle for a container blowing or stretch-blow molding machine starting from parisons made of plastics, said nozzle having a nozzle body capable of coming in contact with an upper face of a mold designed for receiving a parison, said nozzle being characterized in that it comprises:
   an insert provided with a frusto-conical contact face capable of contacting a mouth of the parison, wherein said insert is displaceable with respect of the nozzle body between an upper position and a lower position, and
   a return member which biases the insert towards its lower position.

2. Nozzle according to claim 1, wherein said frusto-conical contact face is capable of contacting an outer edge of the mouth of the parison.

3. Nozzle according to claim 1, wherein said frusto-conical contact face has an aperture angle ($\alpha$) comprised between 10° and 60°, with respect of a plane perpendicular to an axis (A) of displacement of the insert.

4. Nozzle according to claim 1, wherein said contact face is provided with a planar central portion, which extends through a frusto-conical peripheral portion.

5. Nozzle according to claim 4, wherein said planar central portion has an outer diameter greater than or equal to the diameter of the mouth of the container.

6. Nozzle according to claim 1, wherein the nozzle body comprises a shoulder which defines an overtravel limit stop for the insert in the lower position.

7. Nozzle according to claim 1, wherein said return member is a compression spring.

8. Machine for the blowing or stretch blow molding of containers starting from parisons made of plastics, comprising:
   At least one molding unit comprising a mold designed for receiving a parison, and
   A nozzle according to claim 1, movably mounted between an upper position in which the nozzle is spaced apart from an upper face of the mold in order to allow for parison introduction, and a lower position in which the nozzle is in contact with the upper face of the mold.

9. The nozzle according to claim 1, wherein the frusto-conical contact face is at a lower distal end of the insert.

10. A nozzle for a container blowing or stretch-blow molding machine for a parison, comprising:
    a nozzle body configured to contact an upper face of a mold configured to receive the parison;
    an insert comprising a frusto-conical contact face configured to contact a top edge of a mouth of the parison, wherein the insert is displaceable relative to the nozzle body between an upper position and a lower position; and
    a return member that biases the insert towards the lower position.

11. The nozzle according to claim 10, wherein the frusto-conical contact face is located on the insert so that the mouth of a misaligned parison first contacts the insert at the frusto-conical contact face.

12. The nozzle according to claim 10, wherein the frusto-conical contact face is located at a lower distal end of the insert so that the mouth of a misaligned parison first contacts the insert at the frusto-conical contact face.

13. A machine for blowing or stretch blow molding of containers starting from parisons, comprising:
    a parison
    a molding unit comprising a mold configured to receive the parison; and
    a nozzle according to claim 10, movably mounted between an upper position in which the nozzle is spaced apart from an upper face of the mold in order to allow the parison to be introduced into the mold, and a lower position in which the nozzle is in contact with the upper face of the mold.

* * * * *